(12) United States Patent
Chang et al.

(10) Patent No.: US 10,636,133 B2
(45) Date of Patent: Apr. 28, 2020

(54) AUTOMATED OPTICAL INSPECTION (AOI) IMAGE CLASSIFICATION METHOD, SYSTEM AND COMPUTER-READABLE MEDIA

(71) Applicant: INDUSTRIAL TECHNOLOGY RESEARCH INSTITUTE, Hsinchu (TW)

(72) Inventors: Keng-Hao Chang, Taichung (TW); Wei-Yao Chiu, Chiayi (TW); Ya-Hui Tsai, Taoyuan (TW); Jwu-Sheng Hu, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 171 days.

(21) Appl. No.: 15/846,886

(22) Filed: Dec. 19, 2017

(65) Prior Publication Data

US 2019/0130555 A1 May 2, 2019

(30) Foreign Application Priority Data

Oct. 27, 2017 (TW) .............................. 106137265 A (51) Int. Cl.
*G06T 7/00* (2017.01)
*G06K 9/62* (2006.01)
(Continued)

(52) U.S. Cl.
CPC ............ *G06T 7/0004* (2013.01); *G06K 9/627* (2013.01); *G06K 9/6215* (2013.01); *G06K 9/66* (2013.01);
(Continued)

(58) Field of Classification Search
CPC ......... G06T 7/0004; G06T 2207/20081; G06T 2207/30108; G06K 9/6215; G06K 9/627; G06K 9/66; G06N 5/04; G06N 20/00
See application file for complete search history.

(56) References Cited

U.S. PATENT DOCUMENTS

| 8,688,274 B2 | 4/2014 | Shieh et al. |
| 9,046,496 B2 | 6/2015 | Tsai et al. |
| (Continued) | | |

FOREIGN PATENT DOCUMENTS

| CN | 101536011 B | 1/2013 |
| CN | 104670896 A | 6/2015 |
| (Continued) | | |

OTHER PUBLICATIONS

Taiwanese Office Action and Search Report dated May 25, 2018 for Application No. 106137265.
(Continued)

*Primary Examiner* — Ping Y Hsieh
(74) *Attorney, Agent, or Firm* — Birch, Stewart, Kolasch & Birch, LLP (57) ABSTRACT

An automated optical inspection (AOI) image classification method includes sending a plurality of NG information of a plurality of samples from an AOI device into an Artificial Intelligence (AI) module; performing discrete output calculation on the NG information of the samples by the AI module to obtain a plurality of classification information of the samples; performing kernel function calculation on the classification information of the samples by the AI module to calculate respective similarity distances of the samples and performing weighting analysis; based on weighting analysis results of the samples, judging classification results of the samples; and based on the classification results of the samples, performing classification of the samples.

9 Claims, 7 Drawing Sheets

(51) Int. Cl.
*G06K 9/66* (2006.01)
*G06N 5/04* (2006.01)
*G06N 20/00* (2019.01)
(52) U.S. Cl.
CPC ............... *G06N 5/04* (2013.01); *G06N 20/00* (2019.01); *G06T 2207/20081* (2013.01); *G06T 2207/30108* (2013.01)

(56) References Cited

U.S. PATENT DOCUMENTS

| | | | |
|---|---|---|---|
| 9,310,316 B2 | 4/2016 | Wu et al. | |
| 9,645,097 B2 | 5/2017 | Nicolaides et al. | |
| 2002/0165837 A1* | 11/2002 | Zhang | G06K 9/623 706/16 |
| 2008/0281548 A1 | 11/2008 | Algranati et al. | |
| 2009/0279772 A1* | 11/2009 | Sun | G06K 9/6298 382/141 |
| 2013/0028487 A1 | 1/2013 | Stager et al. | |
| 2013/0208978 A1* | 8/2013 | Ribnick | G01N 21/8914 382/159 |
| 2016/0163035 A1 | 6/2016 | Chang et al. | |
| 2017/0132801 A1 | 5/2017 | Trenholm et al. | |

FOREIGN PATENT DOCUMENTS

| | | |
|---|---|---|
| CN | 107527318 A | 12/2017 |
| TW | I480508 B | 4/2015 |
| TW | I493153 B | 7/2015 |
| TW | I517101 B | 1/2016 |
| TW | I525317 B | 3/2016 |
| TW | 201621754 A | 6/2016 |
| TW | I576708 B | 4/2017 |
| TW | 201734888 A | 10/2017 |
| TW | 201800983 A | 1/2018 |

OTHER PUBLICATIONS

Hu et al., "Efficient human detection in crowded environment", Multimedia Systems, 2015, vol. 21, pp. 177-187.

Kuo et al., "Unsupervised Semantic Feature Discovery for Image Object Retrieval and Tag Refinement", IEEE Transactions on Multimedia, Aug. 2012, vol. 14, No. 4, pp. 1079-1090.

Luo et al., "Perspective-Aware Warping for Seamless Stereoscopic Image Cloning", total 8 pages.

Ren et al., "A Generic Deep-Learning-Based Approach for Automated Surface Inspection", IEEE Transactions on Cybernetics, pp. 1-12.

Tsai et al., "Learning and Recognition of On-Premise Signs from Weakly Labeled Street View Images", IEEE Transactions on Image Processing, Mar. 2014, vol. 23, No. 3, pp. 1047-1059.

You et al., "AttachedShock: Design of a crossing-based target selection technique on augmented reality devices and its implications", Int. J. Human-Computer Studies, 2014, vol. 72, pp. 606-626.

* cited by examiner

AUTOMATED OPTICAL INSPECTION (AOI) IMAGE CLASSIFICATION METHOD, SYSTEM AND COMPUTER-READABLE MEDIA

CROSS-REFERENCE TO RELATED ART

This application claims the benefit of Taiwan application Serial No. 106137265, filed Oct. 27, 2017, the disclosure of which is incorporated by reference herein in its entirety.

TECHNICAL FIELD

The disclosure relates in general to an automated optical inspection (AOI) image classification method, system and computer-readable media.

BACKGROUND

Automated optical inspection (AOI) image inspection systems have high speed and high accuracy. AOI systems inspect by using machine visual technology and thus may replace manual inspection. In industry manufacturing process, AOI systems may sense the surface status of the finished product and then inspect the defects such as foreign matter or abnormal pattern by computer image processing algorithm.

However, when tradition AOI systems inspect defects, leakage (referring the situation that the defects are not inspected and thus failed samples are wrongly judged as good samples) or overkill (referring the situation that good samples are wrongly judged as failed samples) may occur. As for leakage or overkill, in tradition, manual inspection is relied to improve the accuracy rate.

Further, in tradition AOI technology, the sample (for example, the wafer) will be fed into training characteristic models, classification mode, defects classification and the like procedures. Therefore, it is difficult to achieve fast production change in tradition AOI technology.

SUMMARY

According to one embodiment, provided is an automated optical inspection (AOI) image classification method. The method includes: feeding a plurality of NG information of a plurality of samples from an AOI device into an artificial intelligence (AI) training module; performing discrete output on the plurality of NG information of the samples by the AI training module to generate a plurality of classification information of the samples; performing kernel function on the plurality of classification information of the samples by the AI training module to calculate respective similarity distances of the samples and to perform weighting analysis; performing classification determination based on weight analysis results of the samples, to determine respective classification results of the samples; and based on the respective classification results of the samples, classifying the samples.

According to another embodiment, provided is an automated optical inspection (AOI) image classification system including: an AOI device, for performing automated optical inspection on a plurality of samples to obtain respective OK information or NG information of the samples; and an artificial intelligence (AI) training module coupled to the AOI device. The AI training module receives the plurality of NG information of the samples from the AOI device. The AI training module performs discrete output on the NG information of the samples to generate a plurality of classification information of the samples. The AI training module performs kernel function on the plurality of classification information of the samples to calculate respective similarity distances of the samples and to perform weighting analysis. The AI training module performs classification determination based on weight analysis results of the samples, to determine respective classification results of the samples.

According to an alternative embodiment, provided is A computer-readable media, when loaded by an automated optical inspection (AOI) image classification system, the AOI image classification system executing the AOI image classification method as described above.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

Figure 1:
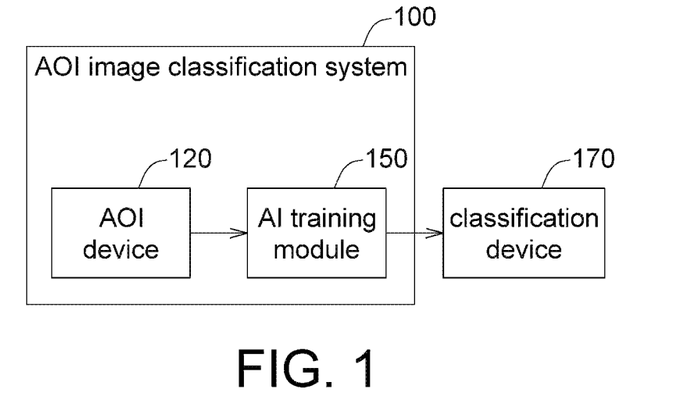
FIG. 1 shows a functional block diagram of an automated optical inspection (AOI) image classification system according to an embodiment of the application.
Figure 2:
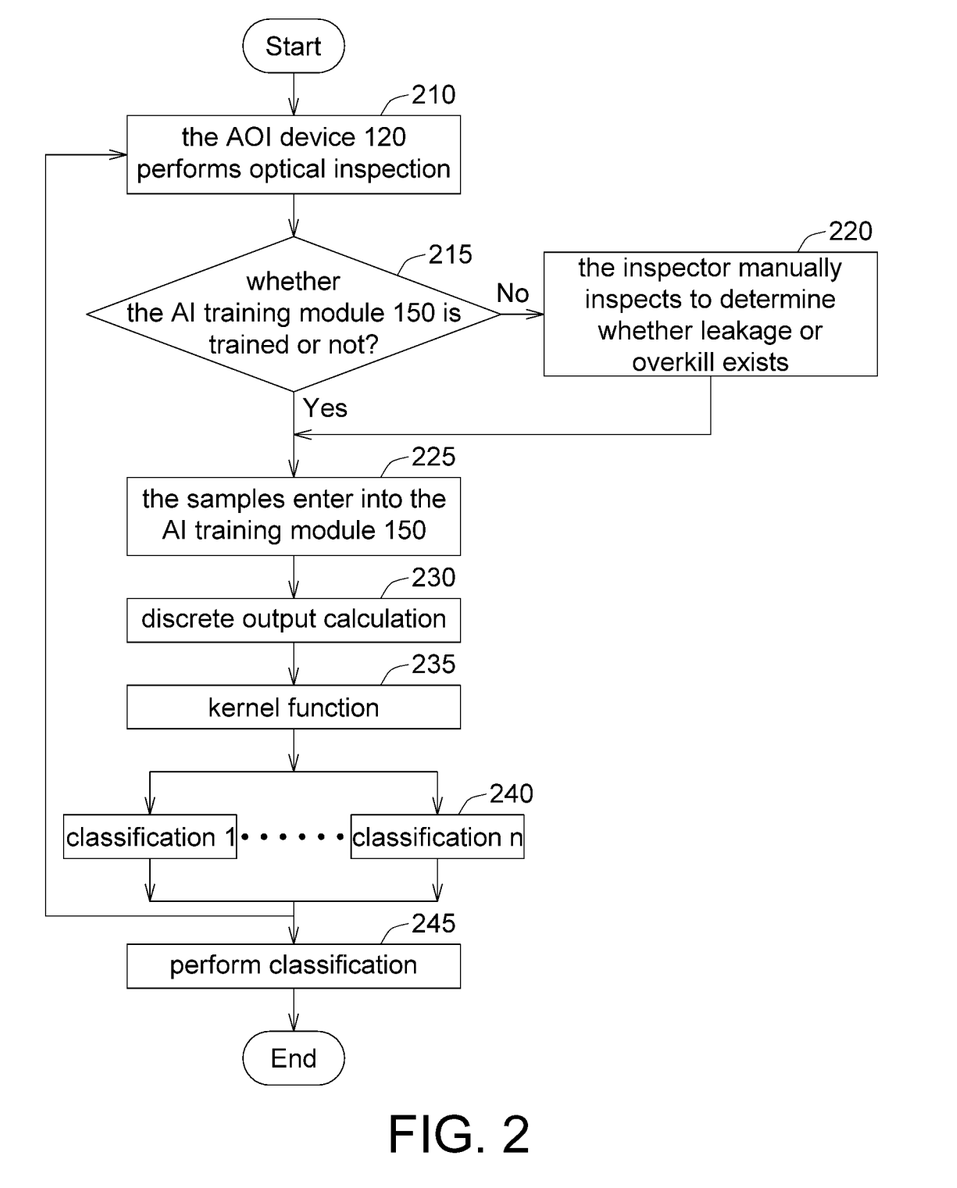
FIG. 2 shows a flow chart of an automated optical inspection image classification method according to an embodiment of the application.
Figure 3A:
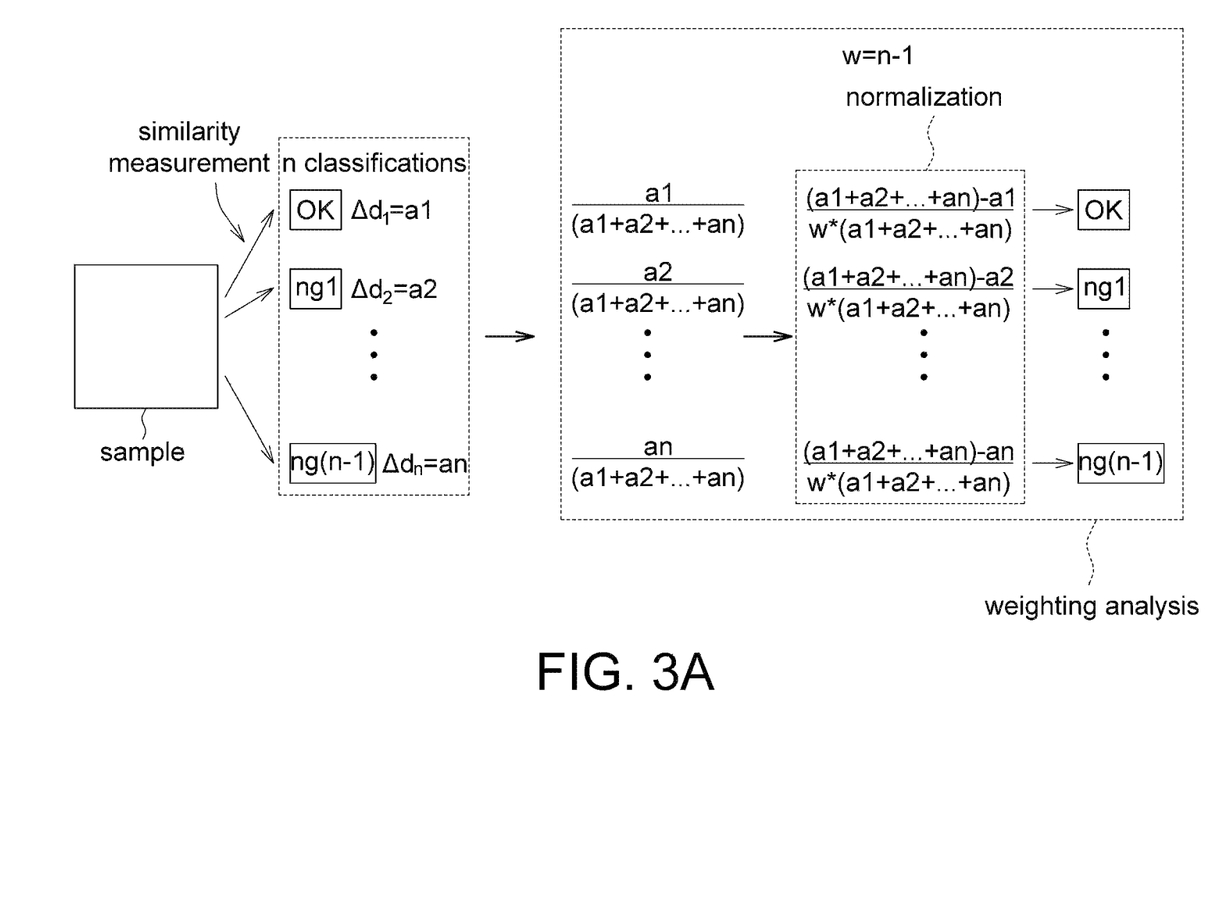
FIG. 3A and FIG. 3B show weight characteristic analysis based on kernel function according to an embodiment of the application.
Figure 3B:
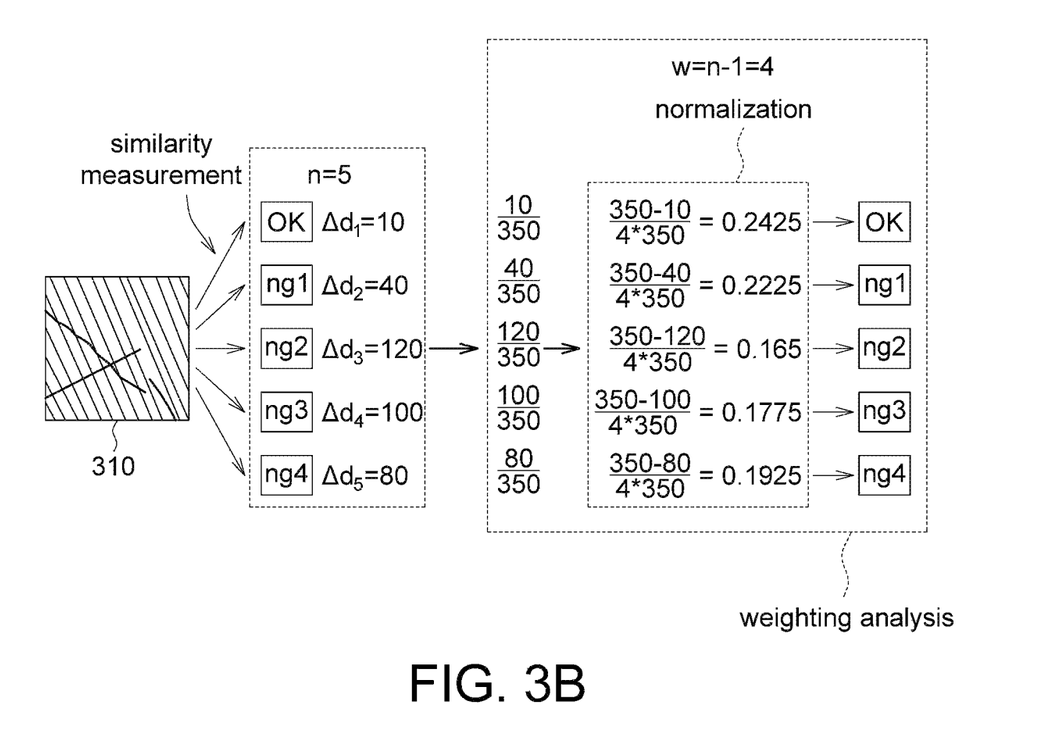
Figure 4A:
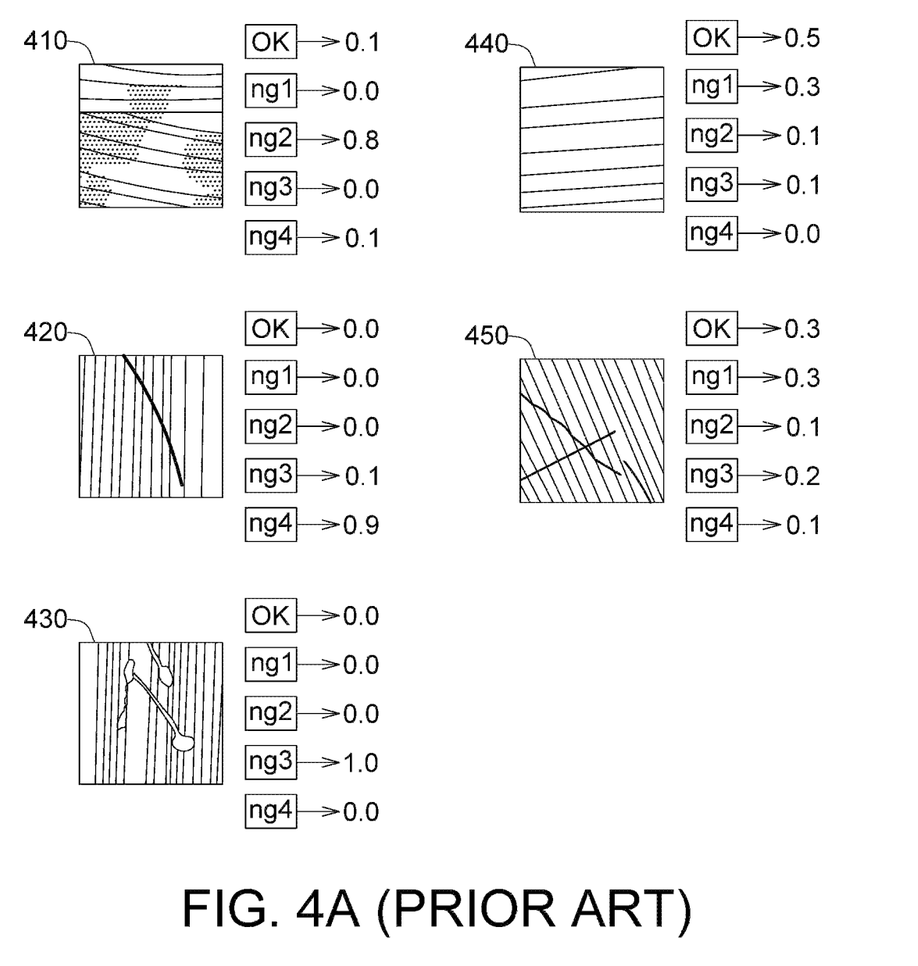
FIG. 4A (prior art) and FIG. 4B show classification results of the prior art and classification results of an automated optical inspection image classification system according to an embodiment of the application, respectively.
Figure 4B:
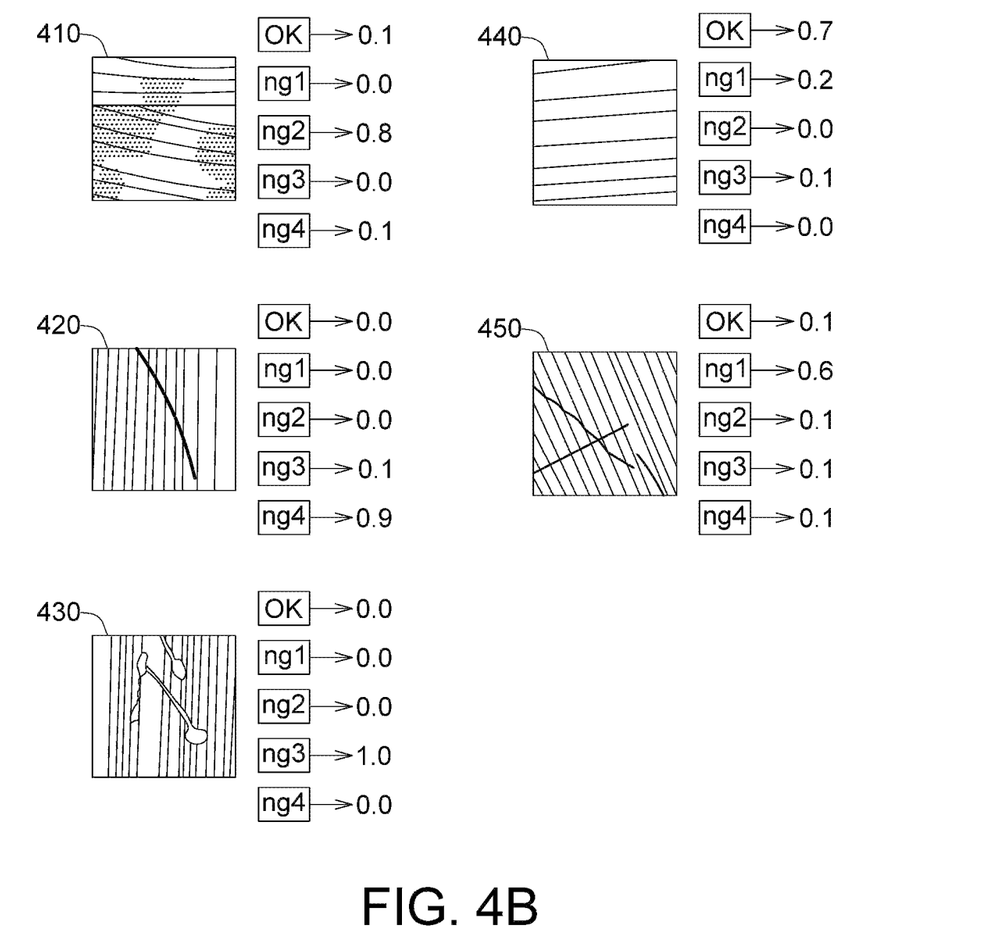

FIG. 1 shows a functional block diagram of an automated optical inspection (AOI) image classification system according to an embodiment of the application. FIG. 2 shows a flow chart of an automated optical inspection image classification method according to an embodiment of the application. FIG. 3A and FIG. 3B show weight characteristic analysis based on kernel function according to an embodiment of the application. FIG. 4A and FIG. 4B show classification results of the prior art and classification results of an automated optical inspection image classification system according to an embodiment of the application, respectively.

In FIG. 1, the AOI image classification system 100 includes an AOI device 120 and an AI (artificial intelligence)

training module 150. The classification result from the AI training module 150 may be sent to a classification device 170 for classification.

The AOI device 120 includes, for example but not limited by, AOI image processing software, AOI sensing system, AOI inspection machine and so on. The structure of the AOI device 120 is not specified here.

The AI training module 150 is coupled to the AOI device 120 for performing defect-overkill determination.

The classification device 170 is for sending the classified samples to classification regions for subsequent sample manufacturing process, sample defect repair or sample disposal. The classification device 170 includes, for example but not limited by, any combination of a pneumatic cylinder, a conveyor, a cantilever mechanism, a robot arm, and a carrier. The structure of the classification device 170 is not specified here.

In an embodiment of the application, the AOI device 120 performs optical inspection (step 210). The optical inspection result may indicate OK (success) inspection result and NG (failed) inspection result. OK (success) inspection result indicates that after inspection, the sample is determined as good but leakage case may possibly exist. NG (failed) inspection result indicates that after inspection, the sample is determined as failed but overkill case may possibly exist.

Thus, in an embodiment of the application, whether the AI training module 150 is trained or not is determined (step 215). If the AI training module 150 is not trained yet (that is, the AI training module 150 is in initial training) or the AI training module 150 should be manually adjusted, then the inspector manually inspects to determine whether leakage or overkill exists (step 220).

In step 225, the samples enter into the AI training module 150, wherein the samples may come from the AOI device 120 or from manual inspection. If the samples come from the AOI device 120, then the samples are what are determined as NG samples by the AOI device 120. If the samples come from manual inspection, then the samples are what are determined as NG samples by the AOI device 120 but determined as OK by manual inspection (i.e. the samples are overkilled by the AOI device 120). In an embodiment of the application, information of the NG samples is referred as NG information.

In step 230, the AI training module 150 performs discrete output calculation on the samples, for obtaining each classification result of the samples.

In an embodiment of the application, the AI training module 150 performs kernel function on the classification result of the discrete output calculation (step 235). In kernel function, similarity measurement or similarity distance of the classification result of the samples is calculated, and weighting analysis is performed on similarity distances. That is, based on similarity distance (or similarity measurement), the sample classification information having high similarity (or small similarity distance) is assigned with high weighting while the sample classification information having low similarity (or large similarity distance) is assigned with low weighting. The weight analysis result may further be normalized. By such, classification result corresponding to blurred defects will be more distinguishable.

In step 240, based on kernel function calculation result, the classification results are determined as one of classification 1–n (n being a natural number). The classification determination result in step 240 may be fed into the AI training module 150 for training the AI training module 150 to increase robustness of the AI training module 150. By so, the classification result difference is more distinguishable (that is, the classification determination is easier).

Further, based on classification determination result in step 240, the classification device 170 performs classification (step 245) and sends the classified samples to classification regions for subsequent sample manufacturing process, sample defect repair or sample disposal and so on.

Refer to FIG. 3A which describes that classification results are improved by kernel function according to an embodiment of the application. In FIG. 3A, the number of classification is n (n being a natural number). Assume that after discrete output, the classification information [X1, X2, . . . , Xn] of the sample 310 is obtained.

The respective similarity measurement (or the similarity distance) between the classification information [X1, X2, . . . , Xn] of the sample 310 and each ideal classification "OK", "ng1", . . . , "ng(n−1)" is calculated. For example, the ideal classification information of the classification "OK" is [1.0, 0.0, . . . , 0.0, 0.0, 0.0]; the ideal classification information of the classification "ng1" is [0.0, 1.0, 0.0, . . . , 0.0, 0.0]; and the ideal classification information of the classification "ng(n−1)" is [0.0, 0.0, 0.0, 0.0, . . . , 1.0].

In an embodiment of the application, the respective similarity measurement (or the similarity distance) between the classification information of the sample and each ideal classification "OK", "ng1", . . . , "ng(n−1)" may be calculated by algorithms. Algorithms suitable in an embodiment of the application include, for example but not limited by, Euclidean Distance algorithm, Manhattan Distance algorithm, Chebyshev Distance algorithm, Minkowski Distance algorithm, Cosine algorithm, Mahalanobis Distance algorithm, Jaccard similarity coefficient algorithm or the like.

As shown in FIG. 3A, after similarity measurement, n similarity distances $\Delta d1=a1$, $\Delta d2=a2$, . . . , $\Delta dn=an$ are obtained, wherein "$\Delta d1$" indicates the similarity distance between the sample classification information and the ideal classification information "OK", "$\Delta d2$" indicates the similarity distance between the sample classification information and the ideal classification information "ng1", . . . and "$\Delta dn$" indicates the similarity distance between the sample classification information and the ideal classification information "ng(n−1)".

The weight analysis is performed and accordingly, the classification information having high similarity is assigned with high weight. In an embodiment of the application, an example of weight analysis is as follows. All similarity distances are added ($\Sigma_1^n ai = a1 + \ldots an$) and the respective similarity distance is divided by the summation of the similarity distances to obtain the following values: "$a1/(\Sigma_1^n ai)$", "$a2/(\Sigma_1^n ai)$", . . . and "$an/(\Sigma_1^n ai)$". Normalization is performed (which is for explanation, not to limit the application) and accordingly, summation of all classification possibility is for example 1. In an embodiment, the following normalization equation is used:

$$\frac{\sum_1^n ai - a1}{w \times \sum_1^n ai}, \ldots, \frac{\sum_1^n ai - an}{w \times \sum_1^n ai}$$

to obtain weighted classification information of the sample, wherein "w" is a normalization parameter.

The similarity distances (the similarity measurement) of the sample are assigned with different weighting. The small similarity distance (the small similarity measurement) is assigned with high weighting and the high similarity distance (the high similarity measurement) is assigned with low weighting.

Thus, the normalized weight analysis result may be used to determine the classification of the sample.

An example of how to improve the classification determination accuracy in an embodiment of the application is described. As shown in FIG. 3B, the embodiment of the application has improved classification determination on the sample 310 by the kernel function. After discrete output calculation, the classification information of the sample 310 is [0.3, 0.3, 0.1, 0.2, 0.1].

The respective similarity measurement (similarity distance) between the classification information [0.3, 0.3, 0.1, 0.2, 0.1] of the sample 310 and each ideal classification "OK", "ng1", "ng2", "ng3" and "ng4" is to be calculated. For example but not limited by, ideal classification information of the classification "OK" is [1.0, 0.0, 0.0, 0.0, 0.0]; ideal classification information of the classification "ng1" is [0.0, 1.0, 0.0, 0.0, 0.0]; ideal classification information of the classification "ng2" is [0.0, 0.0, 1.0, 0.0, 0.0]; ideal classification information of the classification "ng3" is [0.0, 0.0, 0.0, 1.0, 0.0]; and ideal classification information of the classification "ng4" is [0.0, 0.0, 0.0, 0.0, 1.0].

In an embodiment of the application, the respective similarity measurement (similarity distance) between the classification information of the sample 310 and each ideal classification "OK", "ng1", "ng2", "ng3" and "ng4" is calculated by the algorithm.

As shown in FIG. 3B, in a possible embodiment of the application, after similarity measurement calculation, the five similarity distance is Δd1 (or a1)=10, Δd2 (or a2)=40, Δd3 (or a3)=120, Δd4 (or a4)=100, and Δd5 (or a5)=80. Δd1 (or a1) refers the similarity distance between the classification information of the sample 310 and the ideal classification information "OK"; Δd2 (or a2) refers the similarity distance between the classification information of the sample 310 and the ideal classification information "ng1"; Δd3 (or a3) refers the similarity distance between the classification information of the sample 310 and the ideal classification information "ng2"; Δd4 (or a4) refers the similarity distance between the classification information of the sample 310 and the ideal classification information "ng3"; and Δd5 (or a5) refers the similarity distance between the classification information of the sample 310 and the ideal classification information "ng4".

Weighting analysis is performed and accordingly the classification information having high similarity is assigned by heavy weighting. In an embodiment of the application, an example of weighting analysis is as follows. All similarity distances are added ($\Sigma_1^n$ ai=a1+ ... an) and the respective similarity distance is divided by the summation of the similarity distances to obtain the following values: "a1/($\Sigma_1^n$ ai)"=10/350, "a2/($\Sigma_1^n$ ai)"=40/350, "a3/($\Sigma_1^n$ ai)"=120/350, "a4/($\Sigma_1^n$ ai)"=100/350, and "a5/($\Sigma_1^n$ ai)"=80/350. Then, the above equation is used in the normalization calculation (w=n−1=5−1=4).

$$\frac{\sum_1^n ai - a1}{w \times \sum_1^n ai} =$$

$$\left(\sum_1^n ai - a1\right) / [w*(a1+...+a5)] = (350-10)/(4*350) = 0.2425$$

$$\frac{\sum_1^n ai - a2}{w \times \sum_1^n ai} = \left(\sum_1^n ai - a2\right) / [w*(a1+...+a5)] =$$

$$(350-40)/(4*350) = 0.2225$$

$$\frac{\sum_1^n ai - a3}{w \times \sum_1^n ai} = \left(\sum_1^n ai - a3\right) / [w*(a1+...+a5)] =$$

$$(350-120)/(4*350) = 0.165$$

$$\frac{\sum_1^n ai - a4}{w \times \sum_1^n ai} = \left(\sum_1^n ai - a4\right) / [w*(a1+...+a5)] =$$

$$(350-100)/(4*350) = 0.1775$$

$$\frac{\sum_1^n ai - a5}{w \times \sum_1^n ai} = \left(\sum_1^n ai - a5\right) / [w*(a1+...+a5)] =$$

$$(350-80)/(4*350) = 0.1925$$

In other words, the similarity measurement (similarity distances) is assigned by different weighting. The small similarity measurement (similarity distance) is assigned by high weighting; and the large similarity measurement (similarity distance) is assigned by low weighting.

Thus, from the normalization weighting analysis, the sample 310 should be determined as "OK" classification, and the determination has low overkill possibility. On the contrary, if the classification determination is based on the discrete output classification information [0.3, 0.3, 0.1, 0.2, 0.1], then the sample may be classified as the classification "ng1".

As shown in FIG. 4A, in prior art, the classification results of the samples 410-450 may be obtained by discrete output calculation. For example, after discrete output calculation by the AI training module 150, the classification information of the sample 410 is [0.1, 0.0, 0.8, 0.0, 0.1]. Thus, it is good to classify the sample 410 as the classification "ng2" because the possibility "0.8" of the classification "ng2" is far higher than the possibility of other four classifications.

Five classification "OK, ng1-ng4" of FIG. 4A and FIG. 4B are for description, not to limit the application.

Similarly, the classification information of the sample 420 is [0.0, 0.0, 0.0, 0.1, 0.9]. Thus, it is good to classify the sample 420 as the classification "ng4" because the possibility "0.9" of the classification "ng4" is far higher than the possibility of other four classifications.

The classification information of the sample 430 is [0.0, 0.0, 0.0, 1.0, 0.0]. Thus, it is good to classify the sample 430 as the classification "ng3" because the possibility "1.0" of the classification "ng3" is far higher than the possibility of other four classifications.

The classification information of the sample 440 is [0.5, 0.3, 0.1, 0.1, 0.0]. Thus, there is possibly wrong classification if the sample 440 is classified as the classification "OK".

That is because although the possibility "0.5" of the classification "OK" is a little higher than the possibility of other four classification, but not far higher than the possibility of other four classification.

The classification information of the sample 450 is [0.3, 0.3, 0.1, 0.2, 0.1]. Thus, there is possibly wrong classification if the sample 450 is classified as the classification "OK" or "ng1". That is because although the possibility "0.3" of the classification "OK" or "ng1" is a little higher than the possibility of other four classification, but not far higher than the possibility of other four classification.

Thus, as shown in FIG. 4A, in prior art, the sample 440 may be classified as "OK" and the sample 450 may be classified as "OK" (or "ng1"). But, there is possibly wrong classification (or said, ambiguous defect).

Figure 5A:
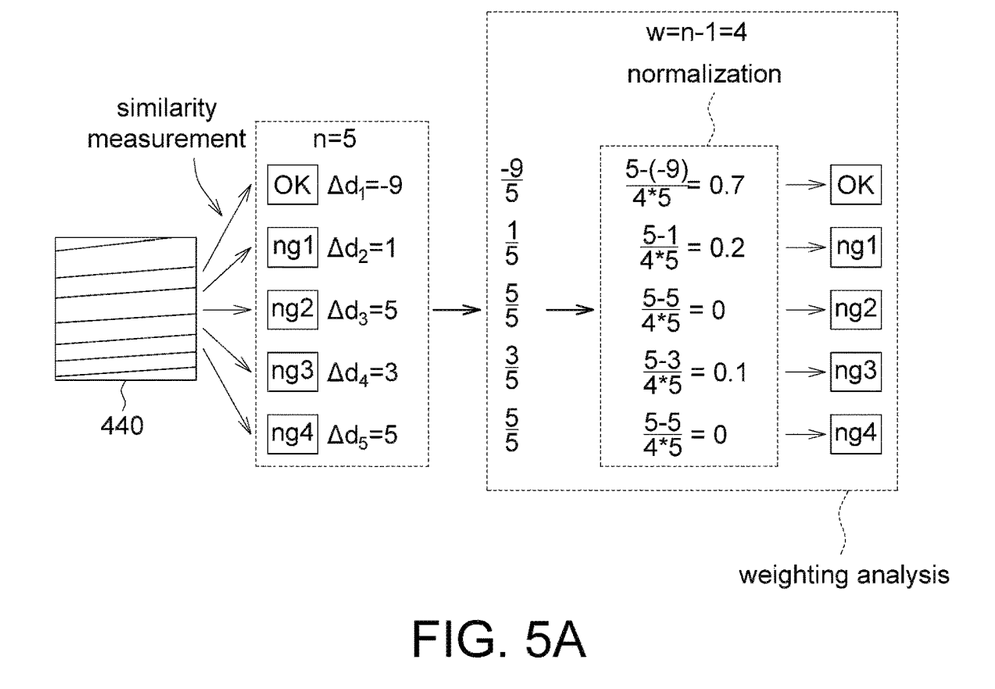
FIG. 5A and FIG. 5B show weight characteristic analysis based on kernel function according to an embodiment of the application.
Figure 5B:
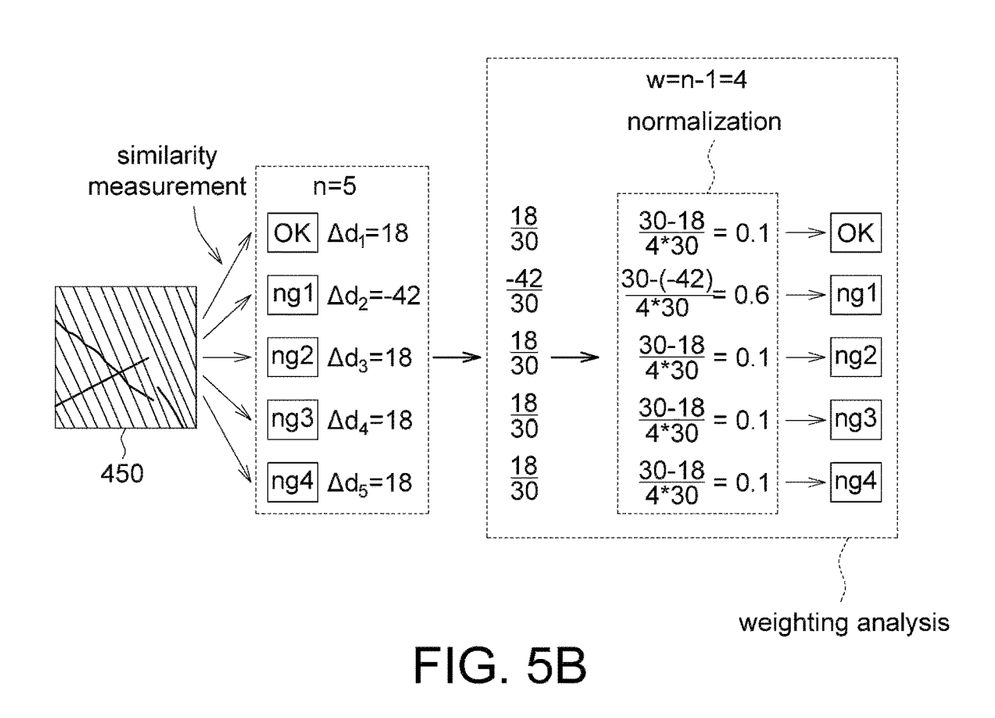

However, in an embodiment of the application, if the AI training module 150 performs the classification flow of FIG. 3 on the samples (for example, the samples 440 or 450) having high error-classification possibility, the classification results of the samples 440 or 450 may be shown in FIG. 5A or FIG. 5B.

That is, as shown in FIG. 5A, the classification information of the sample 440 is [0.5, 0.3, 0.1, 0.1, 0.0]. After similarity measurement, the five similarity distance is $\Delta d1$ (or a1)=−9, $\Delta d2$ (or a2)=1, $\Delta d3$ (or a3)=5, $\Delta d4$ (or a4)=3, and $\Delta d5$ (or a5)=5. $\Delta d1$ (or a1) refers the similarity distance between the classification information of the sample 440 and the ideal classification information "OK"; $\Delta d2$ (or a2) refers the similarity distance between the classification information of the sample 440 and the ideal classification information "ng1"; $\Delta d3$ (or a3) refers the similarity distance between the classification information of the sample 440 and the ideal classification information "ng2"; $\Delta d4$ (or a4) refers the similarity distance between the classification information of the sample 440 and the ideal classification information "ng3"; and $\Delta d5$ (or a5) refers the similarity distance between the classification information of the sample 440 and the ideal classification information "ng4".

Weighting analysis is performed and accordingly the classification information having high similarity is assigned by heavy weighting. All similarity distances are added ($\Delta d1 + \ldots + \Delta d5$) and the respective similarity distance is divided by the summation of the similarity distances to obtain the following values: $\Delta d1/(\Delta d1 + \ldots + \Delta d5) = (-9/5)$, $\Delta d2/(\Delta d1 + \ldots + \Delta d5) = (1/5)$, $\Delta d3/(\Delta d1 + \ldots + \Delta d5) = (5/5)$, $\Delta d4/(\Delta d1 + \ldots + \Delta d5) = (3/5)$, and $\Delta d5/(\Delta d1 + \ldots + \Delta d5) = (5/5)$. Then, normalization calculation is performed to obtain the weighted classification information (w=n−1=5−1=4).

$$\frac{\sum_1^n ai - a1}{w \times \sum_1^n ai} =$$

$$\left(\sum_1^n ai - a1\right) \bigg/ [w*(a1 + \ldots + a5)] = [(5 - (-9)]/(4*5) = 0.7$$

$$\frac{\sum_1^n ai - a2}{w \times \sum_1^n ai} = \left(\sum_1^n ai - a2\right) \bigg/ [w*(a1 + \ldots + a5)] = (5 - 1)/(4*5) = 0.2$$

$$\frac{\sum_1^n ai - a3}{w \times \sum_1^n ai} = \left(\sum_1^n ai - a3\right) \bigg/ [w*(a1 + \ldots + a5)] = (5 - 5)/(4*5) = 0$$

-continued $$\frac{\sum_1^n ai - a4}{w \times \sum_1^n ai} = \left(\sum_1^n ai - a4\right) \bigg/ [w*(a1 + \ldots + a5)] = (5 - 3)/(4*5) = 0.1$$

$$\frac{\sum_1^n ai - a5}{w \times \sum_1^n ai} = \left(\sum_1^n ai - a5\right) \bigg/ [w*(a1 + \ldots + a5)] = (5 - 5)/(4*5) = 0$$

Thus, from the normalization weighting analysis, the sample 440 should be determined as "OK" classification, and the determination has low overkill possibility.

Similarly, as shown in FIG. 5B, the classification information of the sample 450 is [0.3, 0.3, 0.1, 0.2, 0.1]. After similarity measurement, the five similarity distance is $\Delta d1$ (or a1)=18, $\Delta d2$ (or a2)=−42, $\Delta d3$ (or a3)=18, $\Delta d4$ (or a4)=18, and $\Delta d5$ (or a5)=18. $\Delta d1$ (or a1) refers the similarity distance between the classification information of the sample 450 and the ideal classification information "OK"; $\Delta d2$ (or a2) refers the similarity distance between the classification information of the sample 450 and the ideal classification information "ng1"; $\Delta d3$ (or a3) refers the similarity distance between the classification information of the sample 450 and the ideal classification information "ng2"; $\Delta d4$ (or a4) refers the similarity distance between the classification information of the sample 450 and the ideal classification information "ng3"; and $\Delta d5$ (or a5) refers the similarity distance between the classification information of the sample 450 and the ideal classification information "ng4".

Weighting analysis is performed and accordingly the classification information having high similarity is assigned by heavy weighting. All similarity distances are added ($\Delta d1 + \ldots + \Delta d5$) and the respective similarity distance is divided by the summation of the similarity distances to obtain the following values: $\Delta d1/(\Delta d1 + \ldots + \Delta d5) = (18/30)$, $\Delta d2/(\Delta d1 + \ldots + \Delta d5) = (-42/30)$, $\Delta d3/(\Delta d1 + \ldots + \Delta d5) = (18/30)$, $\Delta d4/(\Delta d1 + \ldots + \Delta d5) = (18/30)$, and $\Delta d5/(\Delta d1 + \ldots + \Delta d5) = (18/30)$. Then, normalization calculation is performed to obtain the weighted classification information (w=n−1=5−1=4).

$$\frac{\sum_1^n ai - a1}{w \times \sum_1^n ai} =$$

$$\left(\sum_1^n ai - a1\right) \bigg/ [w*(a1 + \ldots + a5)] = (30 - 18)/(4*30) = 0.1$$

$$\frac{\sum_1^n ai - a2}{w \times \sum_1^n ai} =$$

$$\left(\sum_1^n ai - a2\right) \bigg/ [w*(a1 + \ldots + a5)] = [30 - (-42)]/(4*30) = 0.6$$

$$\frac{\sum_1^n ai - a3}{w \times \sum_1^n ai} = \left(\sum_1^n ai - a3\right) \bigg/ [w*(a1 + \ldots + a5)](30 - 18)/(4*30) = 0.1$$

-continued $$\frac{\sum_{1}^{n} ai - a4}{w \times \sum_{1}^{n} ai} =$$

$$\left(\sum_{1}^{n} ai - a4\right) \bigg/ [w*(a1 + \ldots + a5)] = (30 - 18)/(4*30) = 0.1$$

$$\frac{\sum_{1}^{n} ai - a5}{w \times \sum_{1}^{n} ai} = \left(\sum_{1}^{n} ai - a5\right) \bigg/ [w*(a1 + \ldots + a5)] = (30 - 18)/(4*30) = 0.1$$

Thus, from the normalization weighting analysis, the sample 450 should be determined as "ng1" classification, and the determination has low overkill possibility.

By comparison of FIG. 4A, FIG. 4B, FIG. 5A and FIG. 5B, in an embodiment of the application, after performing kernel function on the samples which may be possibly wrong classified, the classification information having ambiguous defect may higher possibility than other classification information.

In an embodiment of the application, machine learning is used to improve the detection rate of the AOI device.

An embodiment of the application combines the machine visual technology and Maximum Entropy Convolutional Neural Network (MECNN) to lower the leakage rate and the overkill rate, and the normal samples are classified by performing characteristic weight analysis on the overkilled defects. Further, recursive deep learning is achieved (for example, the classification result of the step 240 of FIG. 2 may be fed into the AI training module 150 for training the AI training module 150 again), to lower the overkill rate. Besides, the AI training module 150 may be operated along with the existing AOI device or AOI software. Or, the AI training module 150 may be operated independently. Thus, the flexibility is improved.

In an embodiment of the application, the discrete output results are analyzed by weighting characteristic, for effectively classify the samples having ambiguous defect (which is easily occurred in existing AOI device). Further, the new classification results may be recursively fed back to the AI training module, to enhance the robustness of the AI training module and to improve detection rate of AOI device.

Further, an embodiment of the application provides a computer-readable media. When the computer-readable media is loaded by an AOI image classification system, the AOI image classification system may execute the AOI image classification method in FIG. 2, FIG. 3A, FIG. 3B, FIG. 5B or FIG. 5B.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An automated optical inspection (AOI) image classification method including:
feeding a plurality of NG information of a plurality of samples from an AOI device into an artificial intelligence (AI) training module;
performing discrete output on the plurality of NG information of the samples by the AI training module to generate a plurality of classification information of the samples;
performing kernel function on the plurality of classification information of the samples by the AI training module to calculate respective similarity distances of the samples and to perform weighting analysis;
performing classification determination based on weight analysis results of the samples, to determine respective classification results of the samples; and
based on the respective classification results of the samples, classifying the samples;
wherein the step of calculating respective similarity distances of the samples includes: calculating a plurality of similarity distances between the classification information of the samples and a plurality of ideal classification.

2. The method according to claim 1, wherein the step of perform weighting analysis includes:
assigning respective weighting to the similarity distances of the samples, wherein if a first similarity distance of a first sample is smaller than a second similarity distance of the first sample, a first weight assigned to the first similarity distance of the first sample is higher than a second weight assigned to the second similarity distance of the first sample.

3. The method according to claim 1, wherein the classification results of the samples are fed back to the AI training module for training the AI training module.

4. The method according to claim 1, wherein the step of classifying the samples includes:
classifying by a classification device including any combination of a pneumatic cylinder, a conveyor, a cantilever mechanism, a robot arm, and a carrier.

5. A non-transitory computer-readable media, when loaded by an automated optical inspection (AOI) image classification system, the AOI image classification system executing the AOI image classification method in claim 1.

6. An automated optical inspection (AOI) image classification system including:
an AOI device, for performing automated optical inspection on a plurality of samples to obtain respective OK information or NG information of the samples; and
an artificial intelligence (AI) training module coupled to the AOI device, the AI training module receiving the plurality of NG information of the samples from the AOI device, the AI training module performing discrete output on the NG information of the samples to generate a plurality of classification information of the samples, the AI training module performing kernel function on the plurality of classification information of the samples to calculate respective similarity distances of the samples and to perform weighting analysis, and the AI training module performing classification determination based on weight analysis results of the samples, to determine respective classification results of the samples;
wherein the AI training module calculates a plurality of similarity distances between the classification information of the samples and a plurality of ideal classification.

7. The system according to claim 1, wherein the AI training module assigns respective weighting to the similarity distances of the samples, wherein if a first similarity distance of a first sample is smaller than a second similarity distance of the first sample, a first weight assigned to the first similarity distance of the first sample is higher than a second weight assigned to the second similarity distance of the first sample.

8. The system according to claim 6, wherein the classification results of the samples are fed back to the AI training module for training the AI training module.

9. The system according to claim 6, wherein the classification results, obtained by the AI training module, of the samples are classified by a classification device including any combination of a pneumatic cylinder, a conveyor, a cantilever mechanism, a robot arm, and a carrier.

* * * * *